No. 870,695. PATENTED NOV. 12, 1907.
W. SOBEY.
PLOW.
APPLICATION FILED FEB. 23, 1906.
4 SHEETS—SHEET 4.
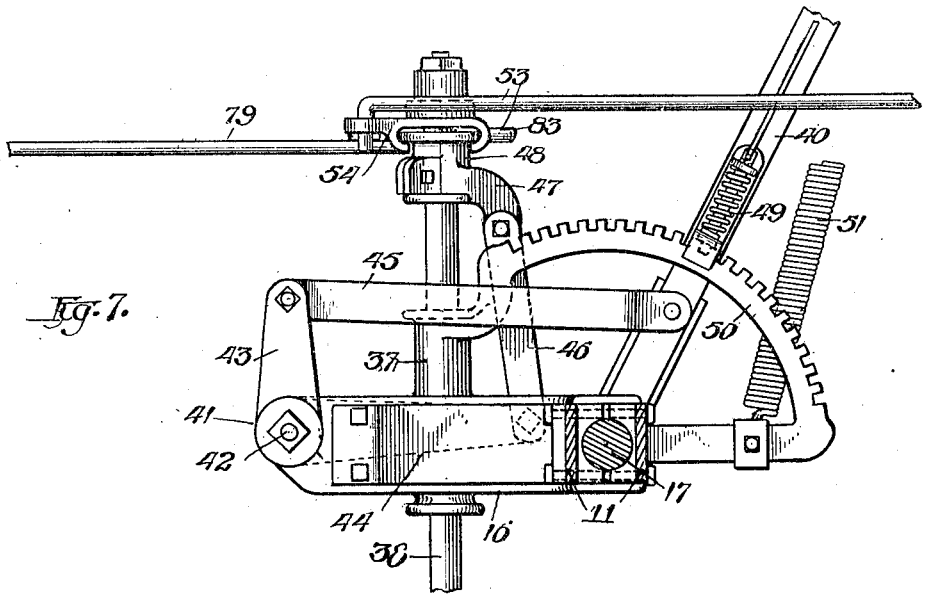
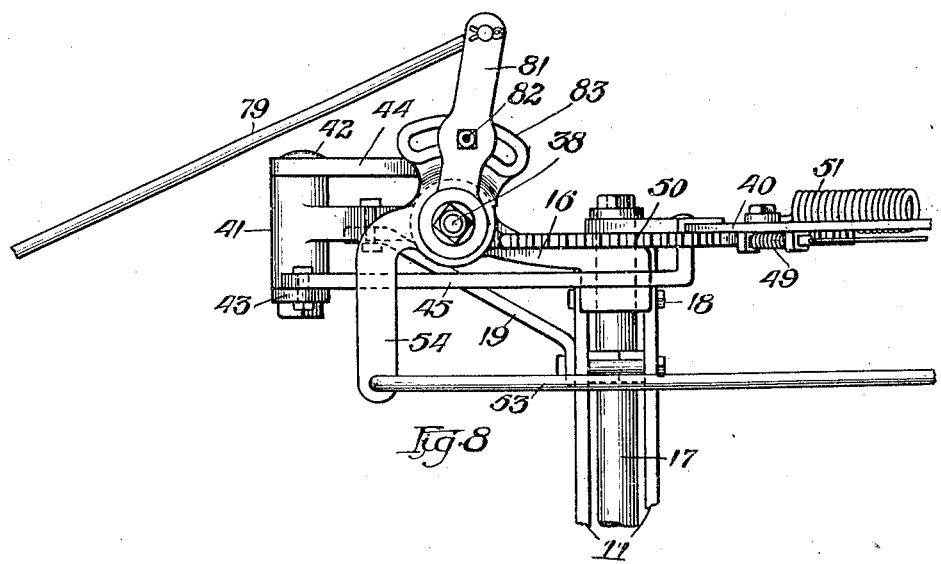
Witnesses:
Wm. P. Bond
Lillian Prentice
Inventor:
William Sobey
By Peirce + Fisher
Attorneys

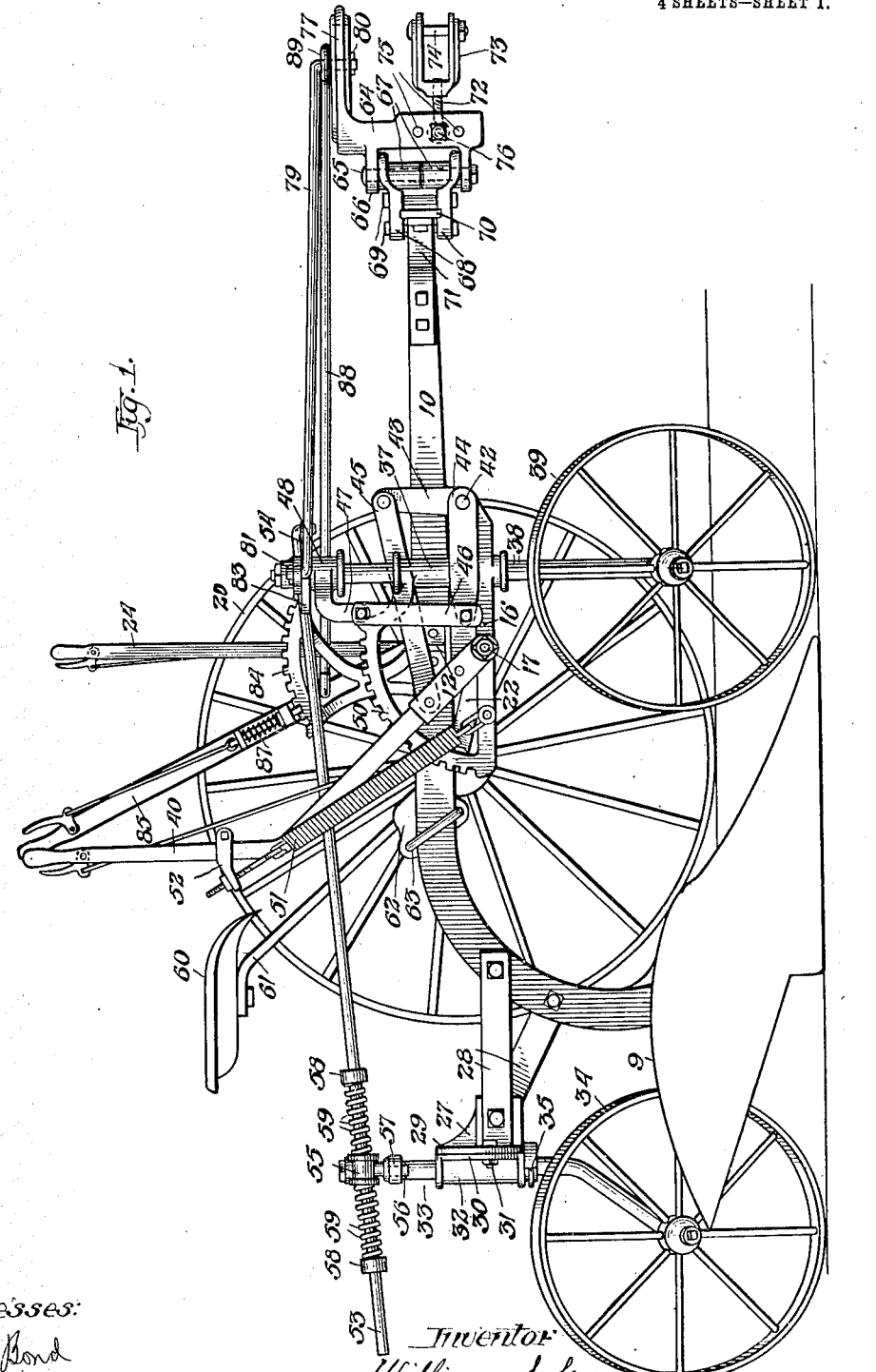

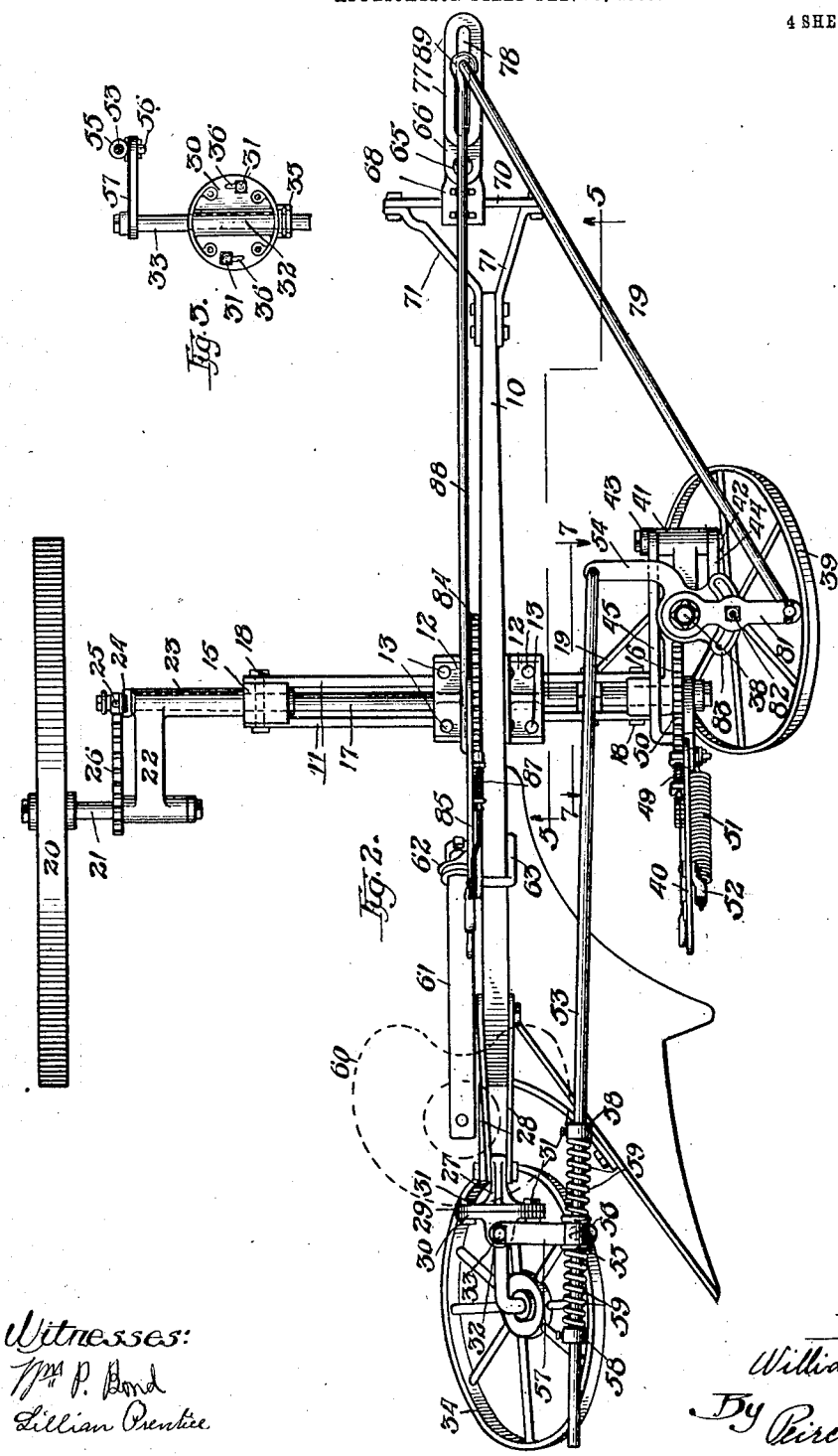

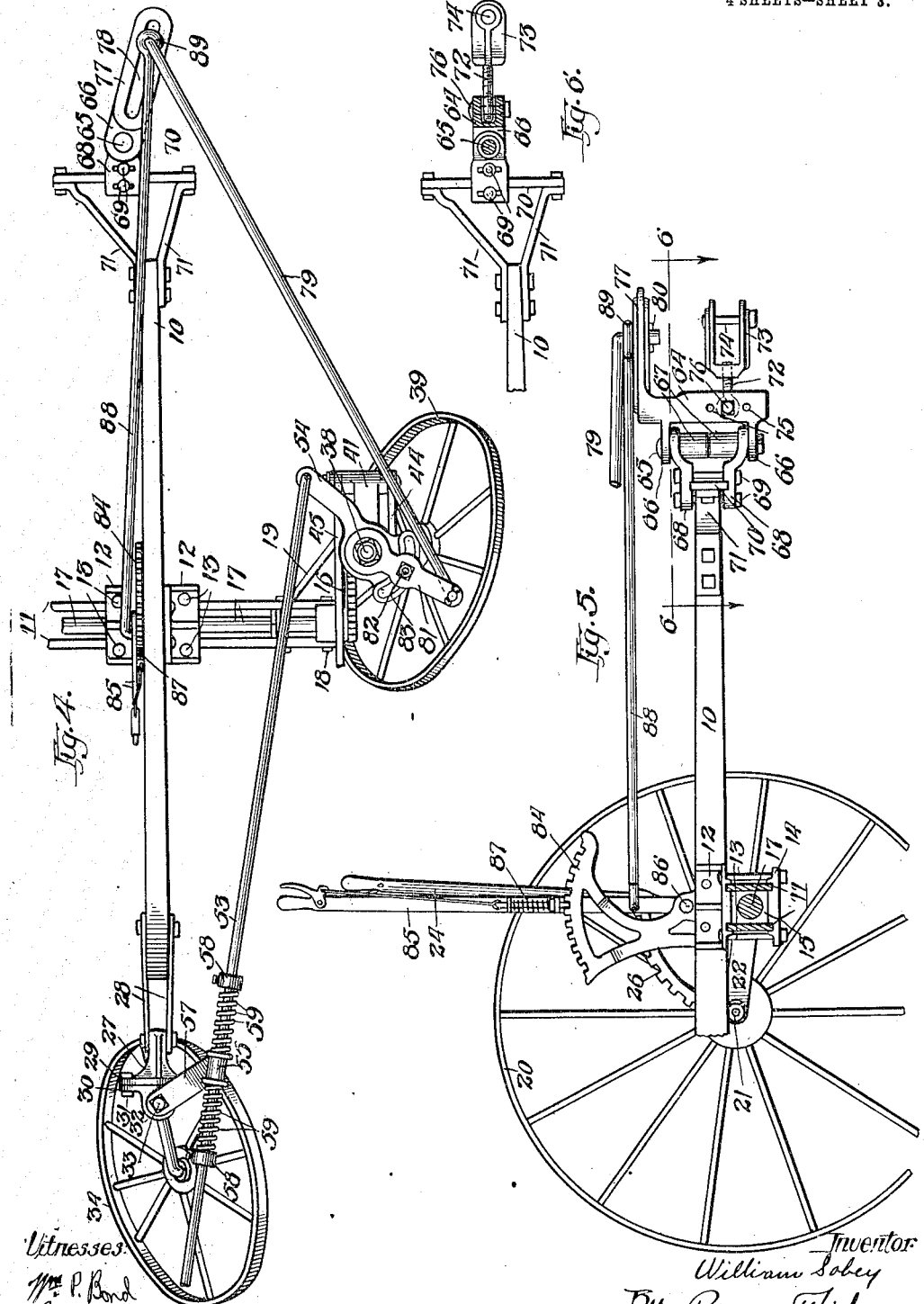

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

PLOW.

No. 870,695.         Specification of Letters Patent.         Patented Nov. 12, 1907.

Application filed February 23, 1906. Serial No. 302,528.

*To all whom it may concern:*

Be it known that I, WILLIAM SOBEY, a citizen of the United States, and a resident of Racine, county of Racine, and State of Wisconsin, have invented certain new and useful Improvements in Plows, of which the following is declared to be a full, clear, and exact description.

The invention relates to plows of the three-wheel type and seeks to provide means by which the furrow wheels, which also act as caster or steering wheels, may be turned either by a turning member under control of the draft animals or by a shifter under control of the rider or operator.

The invention further seeks to provide a simple form of frameless and tongueless plow in which the land-side and furrow wheels and draft member are secured directly to the plow beam and in which suitable means are provided for shifting the land-side and front furrow wheels to raise and lower the plow.
With these and other objects in view, the invention consists in the features of construction, combinations and arrangements of parts hereinafter set forth, illustrated in the accompanying drawings and more particularly pointed out in the appended claims.
In the drawings, Figure 1 is a side elevation of the improved plow with the parts shown in working position. Fig. 2 is a plan view thereof. Fig. 3 is a detail view in elevation of the rear furrow wheel standard and its supporting sleeve. Fig. 4 is a plan view of the furrow or steering wheels and controlling connections therefor with the wheels in the position assumed when the plow is turned to the right. Fig. 5 is an elevation of a portion of the plow with parts shown in section on line 5—5 of Fig. 2. Fig. 6 is a detail view of the connections for the draft animals with parts shown in section on line 6—6 of Fig. 5. Fig. 7 is a detail elevation of the connections to the front furrow wheel standard with parts shown in section on line 7—7 of Fig. 2. Fig. 8 is a plan view of parts shown in Fig. 7.

The plow 9 is mounted on the foot of the usual metal beam 10. The plow beam is connected rigidly to a pair of transverse bars 11 that are arranged on edge and preferably closely adjacent and in parallel relation. The connection between the plow beam and the bars 11 preferably comprises a pair of angle brackets 12 bolted to the opposite sides of the plow beam above the point of the plow and bolts 13 that extend vertically outside of the bars 11, and through the brackets 12 and straps 14 that engage the lower edges of the bars 11 (see Fig. 5).
The faces of the brackets 12 and straps 14 are preferably provided with lugs, as shown, that engage the edges of the bars 11 so that the parts are rigidly secured together. By loosening the nuts on the bolts 13, the plow beam and parts connected thereto may be adjusted along the bars 11.

Between the land-side end of the bars 11 is arranged a block 15 and between the opposite ends is arranged the rear end of a casting or bracket 16. A shaft 17 extends between the bars 11 and is journaled in the block 15 and bracket 16. Bolts 18 extend through the bars 11 and parts 15 and 16 above and below the shaft 17. The bracket 16 extends forwardly from the bars 11 and a diagonal brace 19 is bolted to the bars and to the forward end of the bracket (see Figs. 2, 7, and 8).

The land-side wheel 20 is carried on a stub axle 21 on the end of an arm 22. The upper end of the arm is provided with a sleeve 23 that fits over the land-side end of the shaft 17 that projects beyond the bearing block 15. A shift lever 24 fixed to the outer end of the sleeve 23 is provided with a spring-held dog or latch 25 of usual construction arranged to engage a notched segment 26 that is fixed to the end of the shaft 17. By operating the lever 24 and latch 25, the arm 22 and land-side wheel 20 may be moved on the shaft 17 and fixed in adjusted position.

A bracket or casting 27 is rigidly secured to the rear end of the plow beam by brace straps 28. Bracket 27 is provided with a circular end plate or head 29. A correspondingly shaped plate 30 abuts against the plate 29 and is secured thereto by bolts 31 (see Figs. 1, 2 and 3). Plate 30 is provided with a sleeve 32 and the upright standard 33 of the rear caster or furrow wheel 34 extends through and is rotatable within the sleeve 32. A collar 35 secured to the standard engages the lower end of the sleeve 32. The lower end of the standard 33 is shaped as usual to hold the center of the rear furrow wheel 34 in rear of the sleeve 32 and to position the wheel at an incline to resist the thrust of the plow. The bolts 31 (see Fig. 3) extend through segmental slots 36 in the plate 30 so that the angle of the rear caster wheel may be adjusted as desired.

The bracket 16 is provided intermediate its ends with an upright sleeve 37 through which extends the vertical standard 38 of the front furrow or steering wheel 39. The lower end of the standard 38 is bent as usual to hold the wheel 39 at an angle to resist the thrust of the plow and the standard is rotatable in the sleeve 37 and longitudinally shiftable therethrough to raise and lower the plow. The shift lever 40 for moving the land-side and front furrow wheels to raise and lower the plow is preferably fixed to the end of the shaft 17 outside of the bracket 16. As most clearly shown in Figs. 7 and 8, the forward end of the bracket 16 is provided with a short horizontal sleeve 41 through which extends a short shaft or pivot bolt 42. The inner end of the shaft or bolt 42 carries an upwardly projecting arm 43 and the outer end carries a rearwardly projecting arm 44. A horizontally extending link 45 is pivotally connected to the arm 43 to the shift lever 40. A vertically extending link 46 is pivotally connected to the arm 44 and to a lug 47 on a collar 48 that is secured to the upper end of the standard 38. Lever 40 is provided with a spring-held locking dog or latch 49 of usual construction arranged to engage a notched segment 50 that is secured to or cast in piece with the bracket 16 and its sleeve 37. By means of the lever 40 the land-side wheel 20 and front furrow wheel 39 may be shifted to raise and lower the plow. A lift spring 51 extends between the segment 50 and a lug 52 on the shift lever 40 to assist in raising the parts from the ground.

The standards of the front and rear caster wheels are connected, preferably, by means of a rod 53, the forward end of which pivotally engages the end of an arm 54 mounted upon the upper end of the standard 38 and projecting inwardly therefrom. The rear end of the rod 53 (see Figs. 1, 2 and 3) extends loosely through a short sleeve or collar 55 that is swiveled by a pin or stud 56 to the end of an arm 57 that is fixed to the upper end of the standard 33 and projects outwardly therefrom. A pair of collars 58 are adjustably fixed to the rod 53 on opposite sides of the sleeve 55 and springs 59 coiled about the rod extend between the collars 58 and the sleeve 59 so that the rod is yieldingly and adjustably connected to the standard of the rear furrow wheel.

A rider's seat 60 is carried upon the upper end of a strap or post 61 that is mounted at its lower end in a bracket 62. Bracket 62 is securely clamped to the plow beam in rear of the cross shaft 17 by a U-bolt 63.

In accordance with the present invention, one or both of the furrow wheels are controlled, not only by the draft animals, but means is also provided by which the operator or rider may turn the same. In the form shown, a turning member 64 is mounted at the forward end of the plow beam to swing horizontally upon a vertical pivot bolt 65. Pivot bolt 65 extends through lugs 66 on the rear face of the upright turning member 64 and through sleeves 67 on the forward ends of a pair of brackets 68 that are connected by bolts 69 to a cross strap 70. Strap 70 is connected by diagonal brace pieces 71 to the forward end of the plow beam. The bolts 69 extend on opposite sides of the strap 70 and the brackets 68 are notched to engage the upper and lower edges of the strap. By loosening the nuts on bolts 69 the bracket 68 and parts connected thereto may be adjusted along the strap 70. The turning member 64 is provided with a groove opened at its front to receive the eye of a clevis bolt 72 (see Fig. 6). A U-shaped clevis 73 is threaded upon the outer end of the bolt 72 and is provided with a cross bolt 74 to which the draft evener may be connected. The turning member 64 is provided with a vertical series of holes 75 so that the clevis may be adjustably connected thereto by a horizontal pivot bolt 76. By this arrangement, the clevis is free to swing vertically on the bolt 76 but will move the turning member 64 horizontally when the draft animals turn in one or the other direction.

The upper end of the turning member 64 is provided with a forwardly projecting arm 77 having a longitudinal slot 78 therein. The forward, downwardly bent end of a rod 79 extends through the slot 78 and is connected to the arm by a suitable cross pin or key 80. The rear end of the connecting rod 79 is pivotally connected to the end of an arm 81 that is fixed to the upper end of the front furrow wheel standard 38 and projects outwardly therefrom. The arm 81 is preferably adjustably secured to the standard 38 by the bolt 82 that engages a segmental slot in a part 83 that is conveniently formed in piece with the arm 54 on the standard. When the draft animals are guided to the right or left, the front furrow wheel will be turned in the same direction and the rear furrow wheel in the opposite direction by the connections between the turning member and standards so that the plow may be conveniently guided around a corner. Fig. 4 indicates the position of the parts assumed when the plow is turned toward the right.

The bracket 12 on the land-side of the beam 10 is extended upwardly and provided with a notched segment 84. A steering shift lever 85 is connected by a pivot bolt 86 to the lower portion of the segment 84, and is provided with a spring-held dog or latch 87 of usual construction arranged to engage the notches of the segment. A connecting rod 88, at its rear end, pivotally engages the lever 85 adjacent the lower end thereof. The forward end of the rod 88 is provided with an eye 89 through which the downwardly bent end of the connecting rod 79 extends. By operating the lever 85, the rider may turn the furrow wheels through the medium of the connecting rods 88, 79 and 53. The bent end of the rod 79 and the slotted arm 77 form a lost motion connection between the turning member and the forward ends of the rods 88 and 79, and normally, as indicated in Fig. 2, when the team is guided straight ahead, the forward ends of these rods are at the center of the slot in the arm 77 so that the furrow wheels may be shifted by the lever 85 without affecting the turning member that is controlled by the team. So also, it is apparent that the wheels may be turned by the turning member 64 under control of the draft animals without changing the position of the shift lever 85. In this way the furrow wheels may be shifted either by the turning member under control of the draft animals or by the shift lever 85 under the rider's control independently of the other of such parts.

By this means the plow may be accurately guided to maintain a uniform width of furrow, since, if the draft animals veer to one side or the other, a slight movement of the shift lever will quickly change the line of draft so that the plow will not turn out of the furrow, or change the width of the furrow. So also in hill side plowing, the lever 85 may be employed by the operator to turn the furrow wheels and so guide the plow that it is held to its work when throwing the dirt down hill and prevent it from running too far into the land when throwing the dirt up hill. It is to be understood that these steering features, when broadly considered, are not limited to the manner set forth of mounting and connecting the furrow wheels and turning member, since they may be adapted to types of plow other than the frameless and tongueless form set forth, without departure from the essentials of the invention. More specifically considered, the present invention provides a simple form of frameless and tongueless plow in which the furrow wheels may be guided, both by the team and the operator, and in which a single lever is employed to shift the land-side wheel and front furrow wheel together to and from working position so that the plow is automatically leveled as it is raised and lowered. It will be noted that the plow beam and all parts connected thereto, may be readily adjusted along the bars 11 so that plow bottoms of different sizes can be employed.

It is obvious that the details set forth may be varied without departure from the essentials of the invention.

Having described my invention, what I claim as new and desire to secure by Letters Patent, is:—

1. In wheeled plows, the combination with the rear furrow wheel and its upright standard, of a turning member for said furrow wheel controlled by the draft animals and a shifter under control of the rider for said furrow wheel, said turning members being arranged to turn said wheel without changing the position of said shifter.

2. In wheeled plows, the combination with the furrow wheels and their standards, of a turning member under control of the draft animals and a shifter under control of the rider, said turning members and shifter being connected together and to said standards to turn said furrow wheel.

3. In wheeled plows, the combination with furrow wheels and their upright rotatable standards, of a turning member under control of the draft animals and a shifter under control of the rider, said turning member and said shifter being connected to said standard to turn the same independently of each other.

4. In wheeled plows, the combination with front and rear furrow wheels, upright standards therefor, a turning member under control of the draft animals, a shifter under control of the operator and means connecting said shifter and both said shifter and turning member to said standards to turn the same and said furrow wheels.

5. In wheeled plows, the combination with the front and rear furrow wheels, upright rotatable standards whereon said furrow wheels are mounted, a turning member under control of the draft animals, a shifter under control of the rider and means connecting both said shifter and said turning member to said standards arranged to effect the turning of said standards and furrow wheels by either of said parts independently of the other.

6. In wheeled plows, the combination with the front and rear furrow wheels, upright rotatable standards therefor, connections between said standards, a turning member under control of the draft animals, a shift lever and means connecting both said shift lever and said turning member to the standard of the front furrow wheel, said connections being arranged to permit the independent turning of said furrow wheels either by said turning member or said shift lever.

7. In wheeled plows, the combination with a furrow wheel and its upright standard, of a turning member under control of the draft animals, a connection secured to said standard and having a lost motion engagement with said turning member and means for operating said connection to turn said furrow wheel independently of said turning member.

8. In wheeled plows, the combination with the front furrow wheel and its upright rotatable standard, of a turning member under control of the draft animals having a slotted arm, an arm on said standard, a connecting rod pivoted to the standard arm and engaging the slot of the turning member arm, a shift lever and a connection between said shift lever and said rod.

9. In wheeled plows, the combination with the front and rear furrow wheels, of upright rotatable standards whereon said furrow wheels are mounted, connections between said standards, a pivoted turning member under control of the draft animals having a slotted arm, an arm secured to said standard, a connecting rod pivoted to said standard arm and engaging the slot of said turning member arm, a pivoted shift lever and a rod connecting said shift lever and said first mentioned connecting rod, substantially as described.

10. In wheeled plows, the combination with the front and rear furrow wheels, upright rotatable standards whereon said furrow wheels are mounted, connections between said standards, a front pivoted turning member having a horizontal slotted arm, an arm adjustably mounted on the front furrow wheel standard, a connecting rod pivoted at its rear end to said arm and engaging the slot of said turning member arm at its front end, a pivoted shift lever and a connecting rod pivoted at its rear end to said shift lever and at its forward end to the forward end of the first mentioned connecting rod.

11. In wheeled plows, the combination with the plow and plow beam, of the front and rear furrow wheels, standards therefor, sleeves for said standards connected to the plow beam, connections between said standards, a front turning member under control of the draft animals, a shift lever and means connecting said turning member and said shift lever to said standards arranged to effect the independent turning of said standards and furrow wheels by either of said parts.

12. In wheeled plows, the combination with the plow and plow beam, of the front and rear furrow wheels, upright rotatable standards therefor, sleeves for said standards connected to the plow beam, connections between said standards, a turning member pivoted to the front end of the plow beam, a shift lever pivotally connected to the plow beam, a connecting rod from the front furrow wheel standard having a lost motion engagement with said turning member and a second rod connecting said first mentioned rod with said shift lever.

13. In wheeled plows, the combination with the plow and plow beam, of the front and rear furrow wheels, upright rotatable standards therefor, sleeves for said standards connected to the plow beam, connections between said standards, a turning member pivoted to the front end of the plow beam, a shift lever pivotally connected to the plow beam, a horizontal slotted arm on said turning member, a horizontal arm on the upper arm of the front wheel standard and rods connecting said shift lever and said standard with the slotted arm of said turning member.

14. In wheeled plows, the combination with the plow and plow beam, of front and rear furrow wheels, upright standards therefor, connections between said standards, sleeves for said standards connected to the plow beam, an arm adjustably mounted on said front furrow wheel standard, a turning member pivoted to the front end of the plow beam and having a horizontal slotted arm, a rod pivoted to said standard arm engaging the slot of said turning member and a shift lever pivoted to the plow frame and connected to shift said rod independently of said turning member.

15. In wheeled plows, the combination with the plow and plow beam, of front and rear furrow wheels, upright standards therefor, connections between said standards, sleeves for said standards connected to the plow beam, a turning member pivoted to the front end of said plow beam, a clevis connected to said turning member to shift the same, arms on said turning member and the front furrow wheel standard, a connecting rod between said arms and a shift lever pivotally connected to the plow beam and connected to said rod to shift the same independently of said turning member.

16. In wheeled plows, the combination with the plow and plow beam, of a shaft journaled on the plow beam, an arm on said shaft, a land-side wheel on said arm, front and rear furrow wheels, upright rotatable standards for said furrow wheels, sleeves for said standards connected to the plow beam, connections between said standards, a shift lever connected to said shaft and to the front furrow wheel standard for raising and lowering said land-side and front furrow wheels, a turning member pivoted to the front end of the plow beam and connections between said turning member and the front furrow wheel standard.

17. In wheeled plows, the combination with the plow and plow beam, of a shaft journaled on the plow beam, a land-side wheel carried by said shaft, front and rear furrow wheels, upright standards therefor, sleeves for said standards connected to the plow beam, a turning member connected to the forward end of the plow beam, connections between said turning member and said standards and a clevis connected to said turning member.

18. In wheeled plows, the combination with the plow and plow beam, of transverse bars bolted to said plow beam, a cross shaft journaled in bearings on said bars, an arm adjustably fixed to one end of said shaft, a land-side wheel on said arm, a bracket fixed to said bars on the furrow side of the plow and having an upright sleeve, a front furrow wheel, a standard therefor extending through said sleeve, a shift lever on said shaft adjacent said bracket, a short shaft journaled in said bracket, arms on said shaft, links connecting said arms to said shift lever and said standard, a rear furrow wheel, a standard therefor, a sleeve for said standard connected to the rear end of said plow beam, and connections between the standards of said front and rear furrow wheels.

19. In wheeled plows, the combination with the plow and plow beam, a pair of transverse bars bolted to the plow beam, a cross shaft journaled in the bearings connected to said bars, an arm adjustably secured to one end of said shaft, a land-side wheel on said arm, a bracket fixed to said bars on the furrow side of the plow and having an upright sleeve, a front furrow wheel having a standard extending through said sleeve, a shift lever fixed to said shaft adjacent said bracket, a short shaft journaled in said bracket, arms on said shaft, links connecting said arms with said shift lever and said standard respectively, a rear furrow wheel having an upright standard, a sleeve for said standard rigidly secured to the rear end of the plow beam, arms on said standards and a connecting rod extending between said arms.

20. In wheeled plows, the combination with the plow and plow beam, of transverse bars bolted to the plow beam, a land-side wheel and a front furrow wheel shiftably connected to said bars, a common shift lever for said land-side and front furrow wheels, a rear furrow wheel having an upright standard, a sleeve for said standard and a bracket secured to the rear end of the plow beam whereon said sleeve is rotatably adjustable.

21. In wheeled plows, the combination of the front and rear furrow wheels, standards therefor, connections between said standards, an arm on the front furrow wheel standard, a turning member having a slotted arm and a connecting rod extending between said standard arm and said turning member and engaging said slotted arm.

22. In wheeled plows, the combination with the plow and plow beam, of front and rear furrow wheels, standards therefor, sleeves for said standards connected to the plow beam, a turning member under control of the draft animals pivoted to the forward end of the plow beam and connections between said turning member and said standards.

23. In wheeled plows, the combination with the plow and plow beam, of front and rear furrow wheels, standards therefor, sleeves for said standards connected to the plow beam, a turning member under control of the draft animals pivoted to the forward end of the plow beam, horizontal arms on said standards and on said turning member and connecting rods extending between said arms.

24. In wheeled plows, the combination with the plow and plow beam, of front and rear furrow wheels, upright standards therefor connected together, sleeves for said standards connected to the plow beam, a turning member under control of the draft animals swiveled in the front end of the plow beam and connections between said turning member and the front furrow wheel standard.

25. In wheeled plows, the combination with the plow and plow beam, of front and rear furrow wheels, upright standards therefor connected together, sleeves for said standards connected to the plow beam, a bracket adjustably mounted on the front end of the plow beam, a turning member swiveled to swing horizontally on said bracket, a clevis swiveled to swing vertically on said turning member and connections between said turning member and the front furrow wheel standard.

26. In wheeled plows, the combination with the plow and plow beam, of front and rear furrow wheels, upright standards therefor connected together, sleeves for said standards connected to the plow beam, a turning member swiveled to the front end of the plow beam, a clevis connected thereto to turn the same, arms on said turning member and on the front furrow wheel standard, and a connecting rod extending between said arms.

WILLIAM SOBEY.

Witnesses:
 DANIEL E. HOWELL,
 GEORGE H. BOLTON.